March 10, 1970     R. C. SPAIN     3,499,366
KEY CUTTING MACHINE

Filed July 17, 1967     5 Sheets-Sheet 1

INVENTOR.
Roy C. Spain

March 10, 1970    R. C. SPAIN    3,499,366
KEY CUTTING MACHINE
Filed July 17, 1967    5 Sheets-Sheet 2
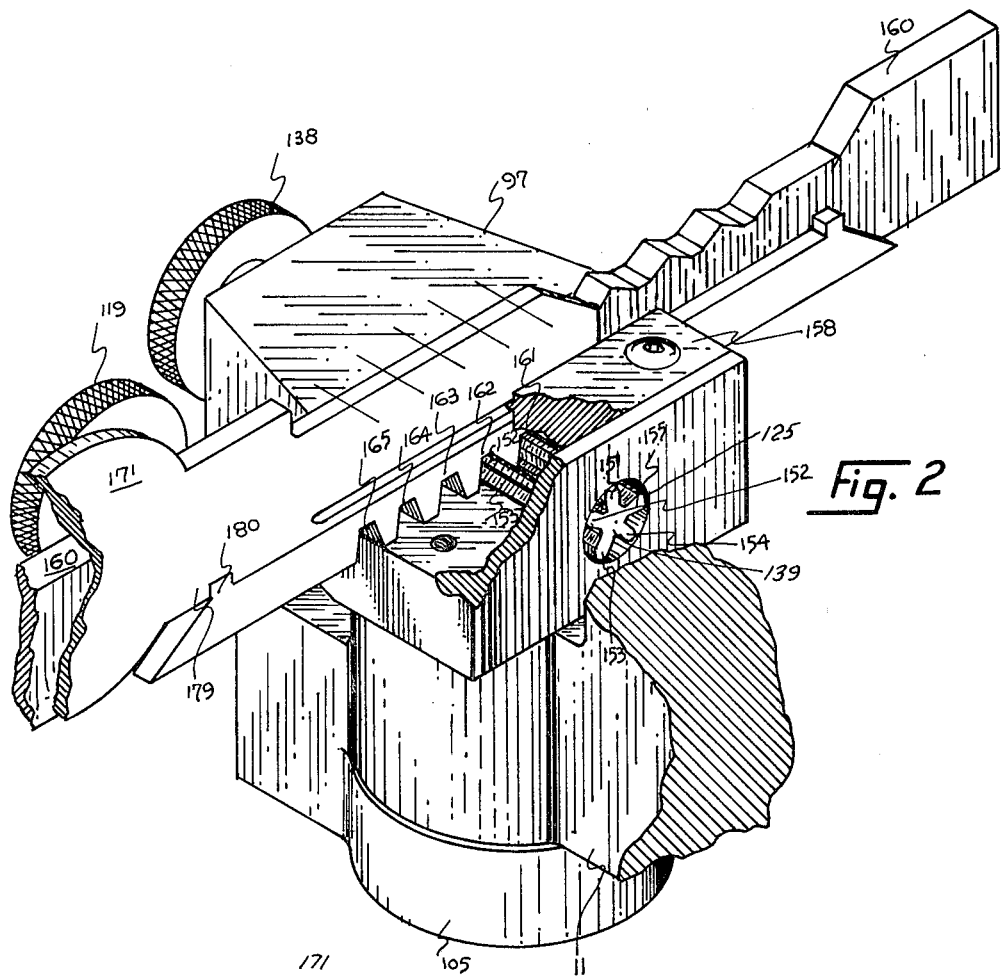
INVENTOR.
Roy C. Spain INVENTOR.
Roy C. Spain INVENTOR.
Ray C. Spain

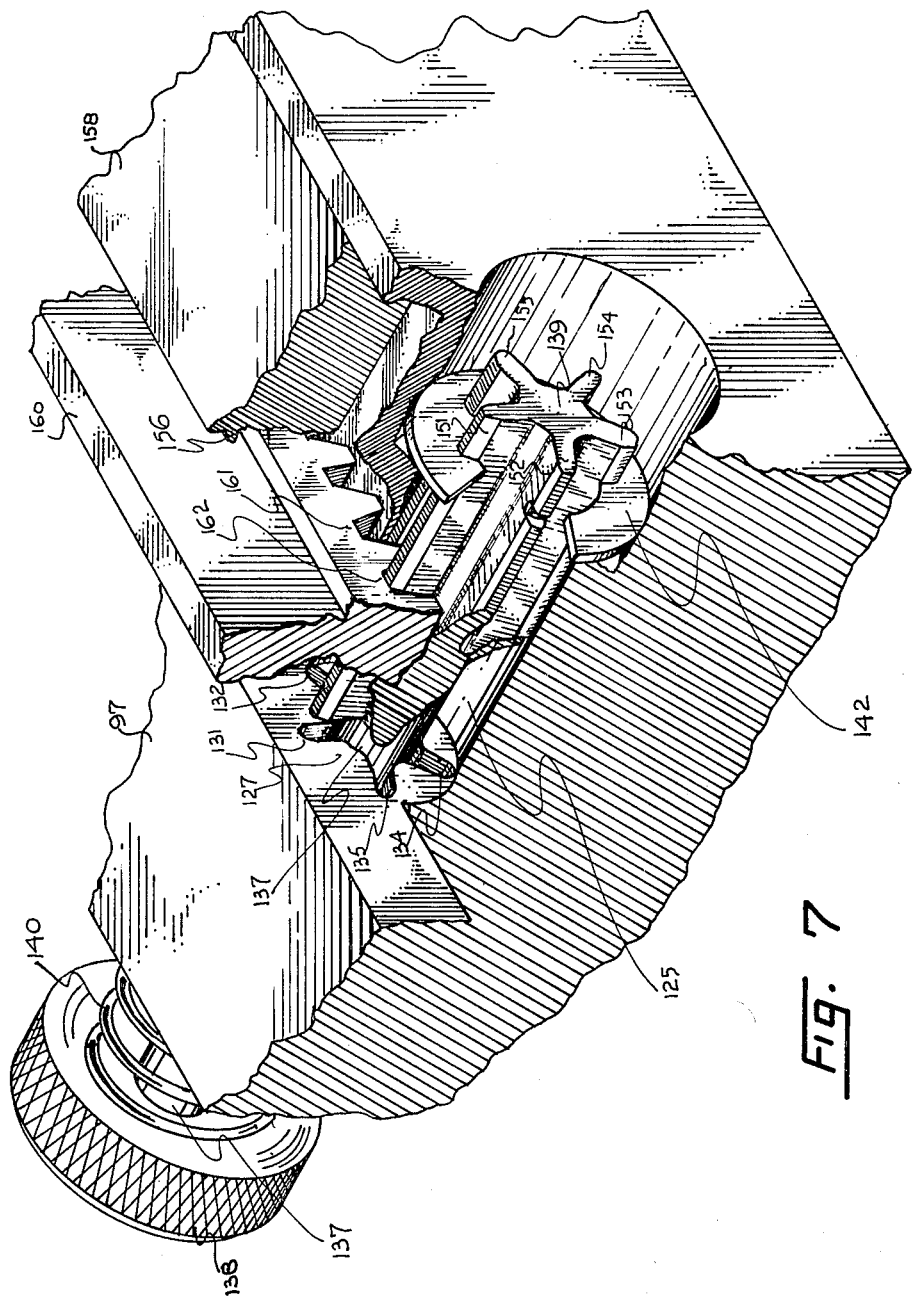

United States Patent Office 3,499,366
Patented Mar. 10, 1970

3,499,366
KEY CUTTING MACHINE
Roy Clifton Spain, P.O. Box 190,
Salem, Va. 24153
Filed July 17, 1967, Ser. No. 653,856
Int. Cl. B23d *41/08;* B23c *1/16;* B26d *7/00*
U.S. Cl. 90—95                              11 Claims

ABSTRACT OF THE DISCLOSURE

A key cutting machine has a rotatably mounted key holder where a key blank may be mounted for cutting. The key holder is positioned for the desired angle of the cut, and is also positioned to cut the desired V bit. The broach is then advanced to cut the selected V bit to the desired bitting level.

---

This invention is directed to a key cutting machine, and it is an object of this invention to provide a new and improved key cutting machine which can cut a variable angle bitted key.

According to this invention, therefore, a new and improved key cutting machine is described. Cutting means are provided for cutting the V bits of the key back to the desired bitting level. Key holding means are also provided, and means are provided for angularly displacing the key blank and the key cutting means for cutting a key variable angle to the longitudinal axis of the key.

The invention is set forth with particularly in the appended claims. The principles and characteristics of the invention, as well as other objects and advantages are revealed and discussed through the medium of illustrative embodiments appearing in the specification and drawings which follow.

In the drawings:

FIGURE 2 is a rear view of a portion of the key cutting machine partially cut away showing the rack and pinion for positioning the key carrier.

FIGURE 3 is a cut away view of the key carrier.

FIGURE 7 is a view of the key holder.

Figure 1:
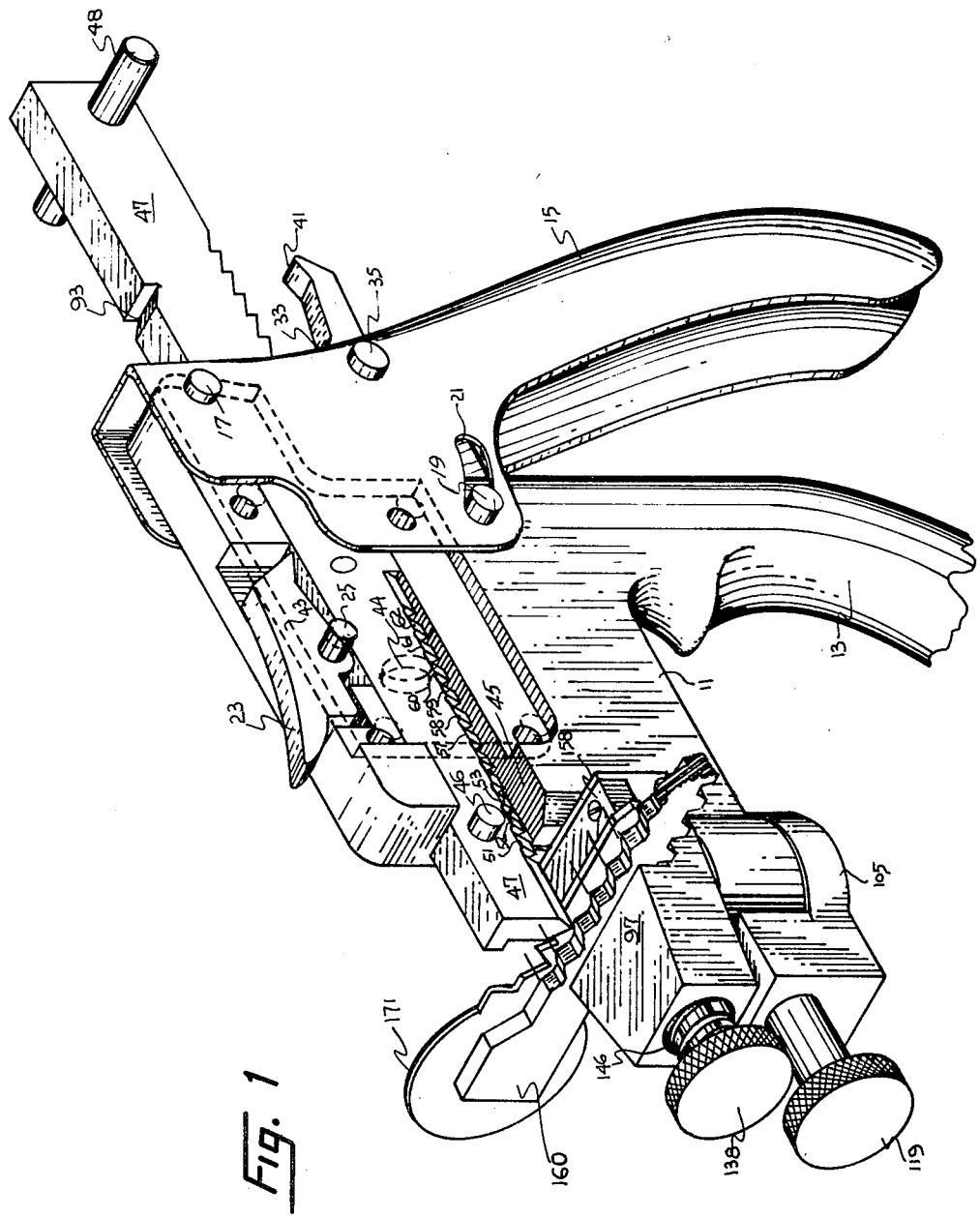
FIGURE 1 is a prespective view of a key cutting machine constructed according to the teachings of this invention.
Figure 4:
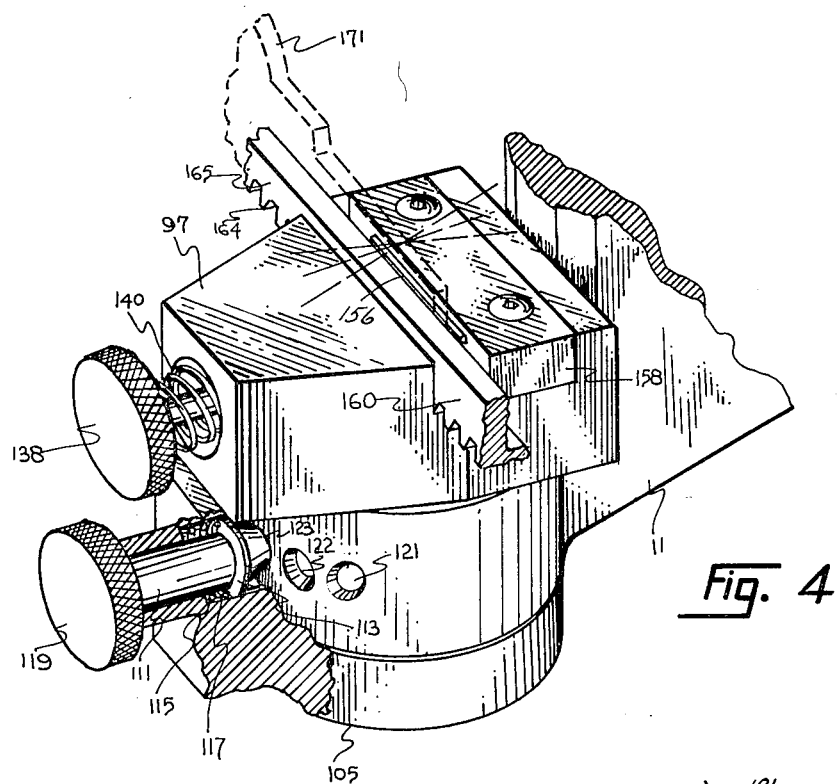
FIGURE 4 is a front view of a keyholder showing the angular positioning.

Referring now to the drawing, a first casting 11 is formed as shown with a handle 13 shaped in the form of a pistol grip. A sheet metal formed handle 15 is pivoted at pin 17 on the first casting 11 so that the pistol handle 13 and the second handle 15 form a pliers type of grip with the second handle movable within the limits permitted by pin 19 mounted on the first casting 11 engaged in slot 21.

A stop plate 23 is pivotably mounted on the first casting 11 by pin 25, and urged in a clockwise direction by compressed spring 27. The stop plate 23 presents a cammed surface 29, and a stop lug 31. A push plate 33 is pivotably mounted in the second handle 15 by pin 35, and urged in a clockwise direction by leaf spring 37, which is pivoted onto the second handle 15. Push plate 33 presents a push lug 39 and a release lever 41.

A cover plate 43 may be placed over the cavity in the first casting 11. A hole 44 is located in cover plate 43. A longitudinal notch 45 is cut in the first casting 11 to permit insertion of a broach 47. Broach 47, has twelve cutting teeth 51–62 thereon, every four teeth are gradated in increments of, 0.013, 0.013, 0.009, and 0.005 inch. Twelve feed teeth 71–82 on the underside of broach 47, correspond to the twelve cutting teeth 51–62. The twelve feed teeth 71–82, are adapted to engage the push lug 39 on the push plate 33. Three stop teeth 91–93 on the top of the broach also are positioned so that they correspond to the twelve cutting teeth 51–62. The first stop tooth 91, is indexed to the first four cutting teeth 51–54 so that after the first four cutting teeth 51–54 have been moved from their initial position, the stop lug 31 engages the first stop tooth 91. The second stop notch 92, is indexed to the second four cutting teeth 55–58 so that after the second four cutting teeth have been moved from their position where the stop lug 31 has engaged the first stop notch 91, the stop lug 31 engages the second stop notch 92. The third stop notch 93 is indexed to the third four cutting teeth 59–62 so that, after the third four cutting teeth 59–62 have been moved from their position where the stop lug 31 has engaged the second stop notch 92, the stop lug 31 will engage the third stop notch 93. A pull pin 48 is secured to one end of broach 47.

The key holder 97 is integrally formed with a bolt 99 which is rotatably mounted in a hole 101 formed in the first casting 11. The end 103 of the bolt 99 is square so that a locking mechanism 105 may be secured onto the bolt 99 by a lock washer 107 and a nut 109 in a manner that the locking mechanism 105 will rotate the bolt 99 and the key holder 97 as the locking mechanism 105 is rotated.

A taper lock pin 111 is slidable engaged in the locking mechanism with a washer 113 secured on the tapered lock pin 111 containing a compressed spring 115 within a recess 117 in the locking mechanism 105 in a manner so that the spring 115 urges the tapered lock pin 111 into engagement with one of three locking recesses 121–123 in the first casting 11. A knurled knob 119 is secured on the taper lock pin 111 so that the tapered locking pin 111 may be removed from engagement with one of the locking recesses 121–123. The three locking recesses are each separated by an angle of approximately 22 degrees. The locking mechanism 105 may thus be rotated to one of three positions and locked into one of three positions indicated by locking recesses 121–123. The rotation of the locking mechanism 105 also rotates the key holder 97 and positions the key holder in the three positions indicated by the three locking recesses 121–123.

The key holder 97 has a longitudinal hole 125 therein with a gear section 127, having five integral gear teeth 131–135. A pin 137 with a knurled knob 138 on one end with integral pinion gear 139 is inserted in the longitudinal hole 125 in the key holder 97. A compressible spring 140 is positioned on the pin 137 between the knurled knob and a recess 141 in the key holder 97 so that the spring 140 urges the pin 137 away from the key holder 97 and the pinion gear 139 into the gear section 127 of the key holder 97. A snap ring 142 is snapped onto the end of the pin 137 so that the spring 140 does not remove the pin 137 from the longitudinal hole 125 in the key holder 97.

The pinion gear 139 has five gear teeth 151–155 which normally engages the five gear teeth 131–135 in gear section 127 of the key holder 97. The five gear teeth 151–155 of the pinion gear 139 are urged into engagement with the five gear teeth 131–135 in the gear section 139 of the key holder 97 by the compressed spring 140. A ball detent 157 is urged into engagement with the pinion gear 139 by compression spring 159 compressed within a recess 161.

The knurled knob 138 may be pushed in, compressing the spring 140, disengaging the pinion gear 139 from the gear section 127 of the key holder 97. The ball detent 157 remains engaged, in the pinion gear 127.

A key carrier 160 is formed in an L shape with a rack on the bottom so that it can be moved in an L shaped slot 156 in the key holder 97. The L shaped slot 160 is perpendicular to the pin 137, and perpendicular to the tapered lock pin 111, so that the key carrier 160 moves in a line perpendicular to the pin 137, and to the tapered lock pin 111. The rack on the key carrier 160 has a plurality of teeth which engage the teeth 151–155 on the pinion gear 127, rotating the knurled knob 138, in a clockwise direction, the pinion gear 127 is rotated so that as the gear teeth on the pinion 127 engage the notches between teeth 161–165 on the rack of the key carrier 160 advancing the key carrier 160. The ball 157 rides up on the advancing gear tooth of the pinion 127 and drops into the valley between the advancing tooth, and the next tooth of the pinion 127.

A key 171 is positioned on the key carrer 160 by inserting the reference notch 179 cut in the key 171 and over the reference stud 180 on the key carrier 160. The portion of the key carrier 160 which is located behind the blade of the key 171 is cut to form a pattern which a bitted key will form, with the pattern just below the lowest bitting to which the key blade will be bitted. This provides a backup for the subsequently described broaching of the key blade. A holding plate 158 with a key guide 156 is secured to first casting 11 so that the keyway of key 171 engages and is held down by the key guide 156.

Figure 5:
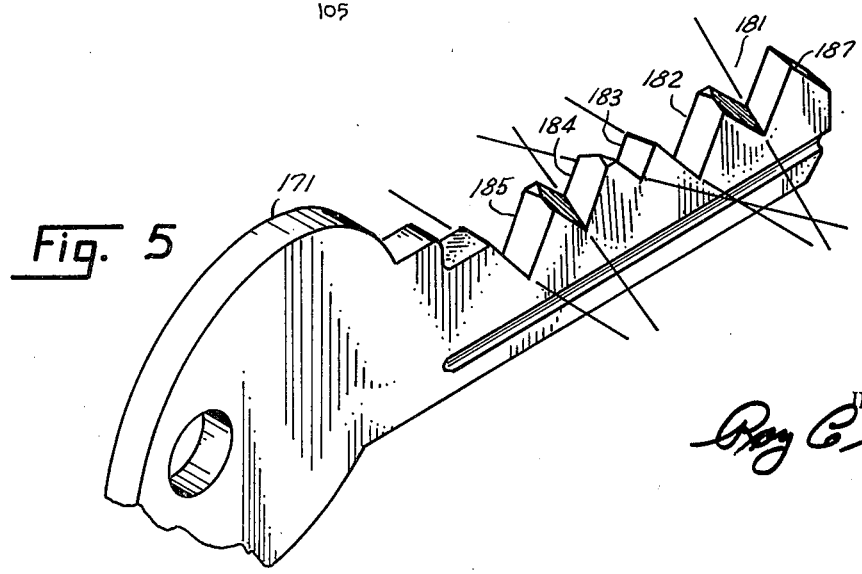
FIGURE 5 is a perspective view of a key cut with this key cutting machine.
Figure 6:
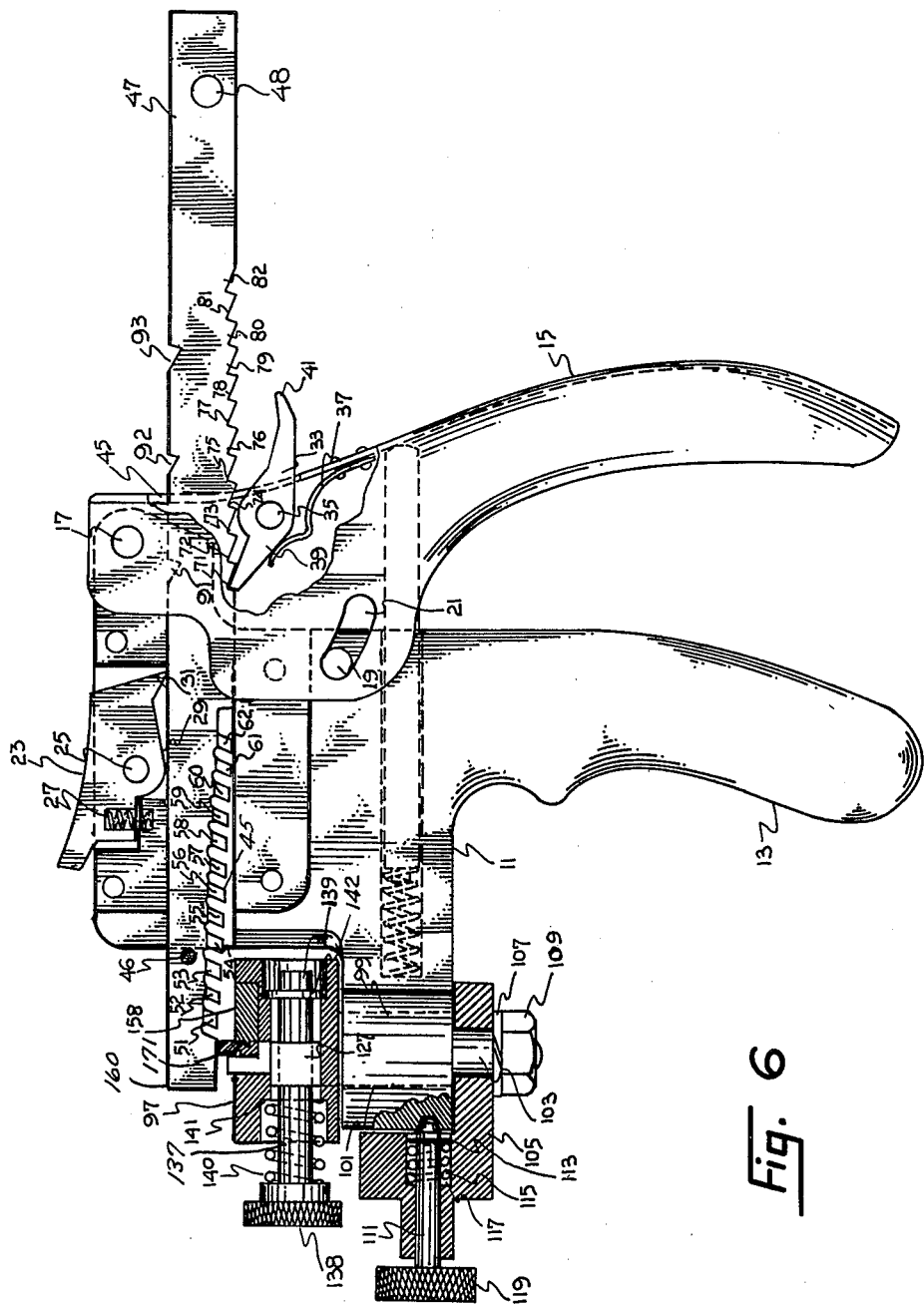
FIGURE 6 is a sectional view of the key cutting machine.

Referring now to FIGURE 5, a key is shown which may be bitted using the key bitting machine described above. This key will be described, and then the operation of the key bitting machine to properly bit this key will be described. In the key 171 shown the key bittings are cut to three levels, and five V bits 181–185 are cut in the key 171. V bit 181 is cut to the second level, V bit 182, is cut to the third level, V bit 183 is cut to the first level, V bit 184 is cut to the second level, and V bit 185 is cut to the third level. The leading edge 187 of the key 171 is cut to an angle of approximately 45° with the back of the key 171.

V bits 182 and 185 are cut in the conventional manner with the center cut. V bits 181, 183, and 184 are cut at an angle of 22° to the center cut. V cut 184 is cut in a clockwise or left direction from the center cut to form a valley 184 forming a 22° angle with the center cut V bit 185 and 182. V bit 181 is also cut in a clockwise or left direction from the center to form a valley 181 forming a 22° angle with the center cut V bit, 185 and 182.

V bit 183 is cut in a counterclockwise or right direction from the normal center cut to form a valley, 183 forming a 22° angle with the center cut V bit 185 and 182.

OPERATION

Key 171 may be properly bitted in the following manner using the key cutting machine shown. The broach 47 is retracted by rotating the lever 41, in a counterclockwise direction, disengaging the push lug 39 from engagement with teeth 71–82, and pulling on the pull pin 48 until the stop pin 46 on the broach 47 is stopped by the first casting 11. A key blank 171 is secured onto the key carrier 160 by locating the reference notch 179 on the key 171 on the reference lug 180, and inserting the keyway into key guide 156. The knurled knob 138 is then pushed in so that the pinion gear 127 disengages from the gear section 127, and remains engaged in the rack on the key carrier 160 and the ball 157. The knurled knob 138 is then rotated to move the key carrier 160 to position the desired V bit 181–185, under the broach 47 so that the desired V bit may be cut to the desired level. For instance, to cut the V bit 181 in the key 171, the knurled knob 138 is pushed in and rotated to position the V bit 181 under the broach 47. The knurled knob is then released so that spring 140 urges the pinion gear 139 back into engagement with the gear section 127 in the key holder 97 and the key carrier 160 is locked aganst further lateral movement. The key 171 is thus positioned for the cutting of the V bit 181 to the desired level.

The knurled knob 119 is then pulled back, the locking means 105 rotated and the tapered lock pin 111 is released into either the left cut, locking recesses 121, the center cut locking recess 122, or the right cut locking recess 123, depending on the angle of the V cut desired on the key 171. The locking mechanism 105 is secured to the key holder 97 so that as the locking means 105 is rotated, the key holder 97 and key carrier 160 are also rotated. V bit 181 of key 171 is cut in a left angle from the center cut, so that the locking means 105 is rotated and the lock pin 111 is released in the left cut locking recess 121. The key carrier 160, and the key blank 171 has thus been rotated to a position that is 22° to the left of a line perpendicular to the key.

The first V bit 181 of the key 171 is to be cut to the second level at an angle of 22° to the left of the center cut. The key 171 has been positioned at the left cut angle.

The pliers handles are then squeezed so that the push lug 39 engages the first tooth 71, advancing the first cutting tooth 51 on the broach through the key blank 171 at the first V bit position 181. The first tooth 51 removes approximately 0.013 inch of the metal on the key 171. As the key blank 171 is positioned at a left angle 22° from the center cut, the metal is removed at an angle.

The pliers handles are then squeezed three more times so that the cutting teeth 52, 53, and 54 remove an additional 0.027 inch of the metal, and 0.040 inch of the metal have been removed altogether. The stop 31 then drops into the first level stop notch 91, indicating that the metal has been removed from the key blank at the key V position 181 down to the first level. The bitting level to which the V bit 181 has been cut, can also be read in the hole 44 in the cover 43. V bit 181 is to be cut to the second level, so that the stop 31 is released, and the pliers handles are squeezed four more times, removing another 0.040 inch of metal from the key blank at V bit position 181. After the pliers handles have been squeezed the second four times, the stop 31 engages the stop notch 92 indicating that the broach 47 has cut the V bit position 181 to the second level.

V bit 181 has thus been cut in a left cut which is 22° to the left of a center cut to the second level.

The other V bits 182–185, may be cut in a similar manner with the key holder 97 positioned for a left, center, or right cut, and the broach advanced to cut metal to the first, second, or third level for each V bit.

The key 171 is advanced to the other four V bits, positioned by pushing in the knurled knob 138 in the manner previously described to disengage the pinion gear 139 from the gear section 127, and rotating the knurled knob 138 so that the pinion gear 139 advances the key 171 to present the desired V bit location to the broach 47.

The key cutting machine which has been described is one which is hand operated. This machine is well adapted for cutting one key at a time when the combinations of angles and level bittings is known. This invention may also be adapted for factory manufacture of keys. In such a factory key cutting machine, the cutting of the bitting levels is carried out by rotating cutting wheels, and the key blanks are presented to one cutting wheel at a time so that one V bit may be cut at a time. According to this invention, the key carrier may be rotated in a similar manner to that described above to insure that the V bits are either cut at a left, center, or right angle cut. It would also be possible to rotate the cutting wheel at each cutting station to cut the V bit at the proper angle cut.

It is also possible to use this invention in the key cutting machines of the type normally found in hardware stores and the like where a key blank is cut from an existing key. In such key cutting machines a guide follows the V bits of the existing key while a cutting wheel cuts corresponding V bits in a key blank. This invention may be utilized in such key cutting machines by providing two identical key holders similar to key holder 97, with one of these key holders holding the existing key and the second key holder holding the key blank. A guide would follow the V bits in the existing key, and a corresponding cutting wheel cut desired V bits in the key blank. The key holders would be rotated as described for key holder 97 to present the proper angle for the V bit to be cut. Alternatively the guide and the cutting wheel could be rotatably mounted to cut the proper angle in the V bits in the key blank.

It should be noted that the cutting machine described and claimed is not limited to cutting V bits, but by adapting the cutting means such as the broach, other slopes of bits may also be cut.

What is claimed is:

1. A key cutting machine for cutting the bits in a key comprising means for holding the key, means for rotating said key holding means and means to enable said cutting means to cut the bits in the key angularly and vertically to the longitudinal axis of the key.

2. A key cutting machine for cutting the bits to a bitting level in a key comprising means for holding the key, a broach, said broach having a plurality of cutting teeth, said cutting teeth graduated in depth, and means for advancing said broach across said key holding means, to cut the bits to a bitting level dependent upon the number of teeth advanced across said key holder.

3. The invention as claimed in claim two (2) wherein means are provided for rotating said key holding, means to enable said broach to cut the bits in the key angularly and vertically to the longitudinal axis of the key.

4. A key cutting machine for cutting the bits in a key comprising, means for holding the key, means for cutting bits in the key, and means for rotatably displacing said cutting means and said key holding means relatively to each other to enable said cutting means to cut the bits in the key angularly and vertically to the longitudinal axis of the key.

5. The invention as claimed in claim three (3) wherein said key holding means includes a moveable key carrier for carrying the key.

6. The invention as claimed in claim five (5) wherein means are provided for moving said key carrier to position selected bits on the key for cutting by said broach.

7. The invention as claimed in claim five (5) wherein said key carrier has a rack thereon, and a rotatable member having a pinion gear thereon engaged in said rack to position said key carrier.

8. The invention as claimed in claim seven (7) wherein means are provided for locking said pinion gear after said key carrier has been positioned for cutting by said broach.

9. The invention as claimed in claim five (5) including a key having reference means thereon, and said key carrier is provided with a reference lug for engagement with said reference means on said key.

10. A key cutting machine for cutting the bits in a key comprising, a key having a key way thereon, means for cutting bits in said key, means for rotatably displacing said cutting means, and said key holding means relatively to each other to enable said cutting means to cut the bits in said key angularly and vertically to the longitudinal axis of said key, and means associated with said cutting means having a key guide for engagement with said key way in said key.

11. The invention as claimed in claim two (2) wherein means are provided to cooperate with said broach and said advancing means to indicate the bitting level to which the key has been cut.

References Cited

UNITED STATES PATENTS

| 1,000,415 | 8/1911 | Knaus | 90—57 XR |
| 1,024,254 | 4/1912 | Garrett | 90—57 |
| 2,909,966 | 10/1959 | Barens | 90—13 |
| 2,913,963 | 11/1959 | DeBoer et al. | 90—13 |

GERALD A. DOST, Primary Examiner

U.S. Cl. X.R.

83—466; 90—13.05